May 19, 1959     D. PESCARA     2,887,463
ANTI-THEFT DEVICE FOR MOTOR VEHICLES

Filed Sept. 4, 1958     3 Sheets-Sheet 1

INVENTOR.
DOMINGOS PESCARA
BY
ATTORNEY

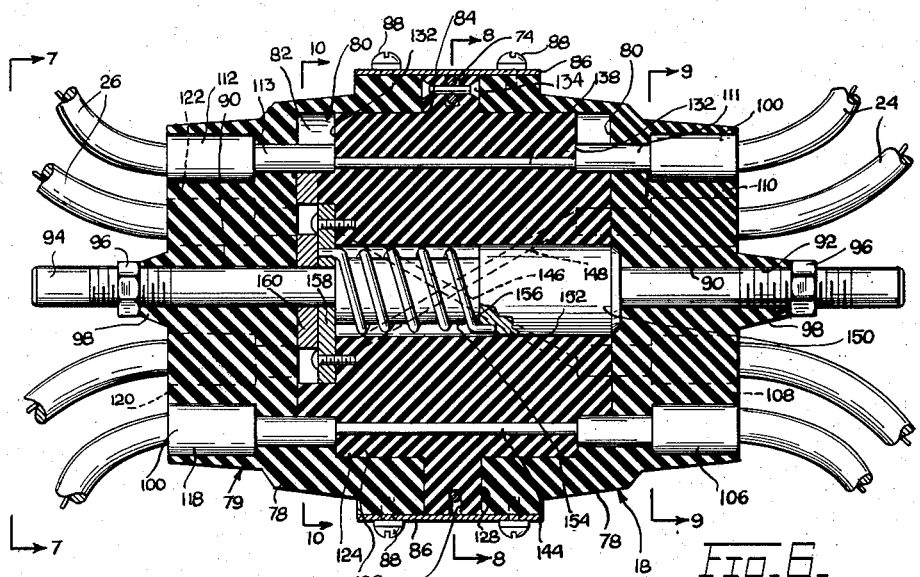
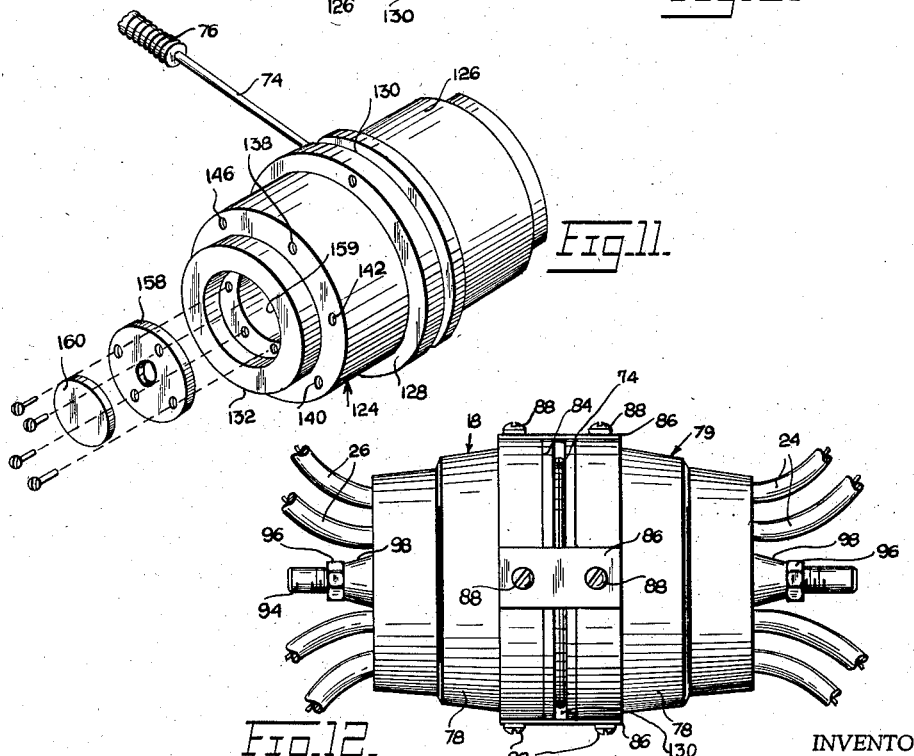

May 19, 1959  D. PESCARA  2,887,463
ANTI-THEFT DEVICE FOR MOTOR VEHICLES
Filed Sept. 4, 1958  3 Sheets-Sheet 3
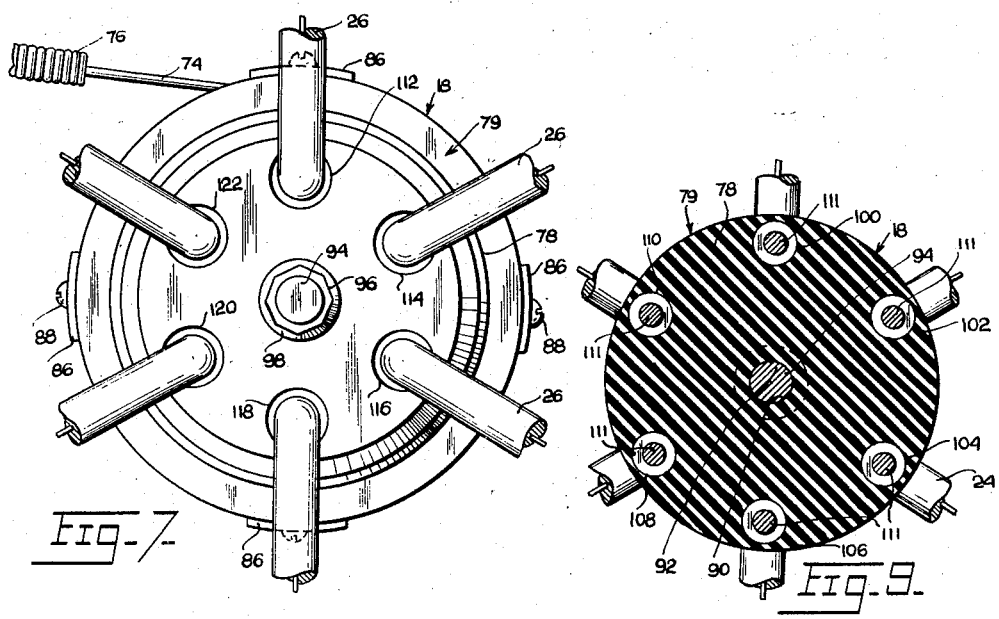
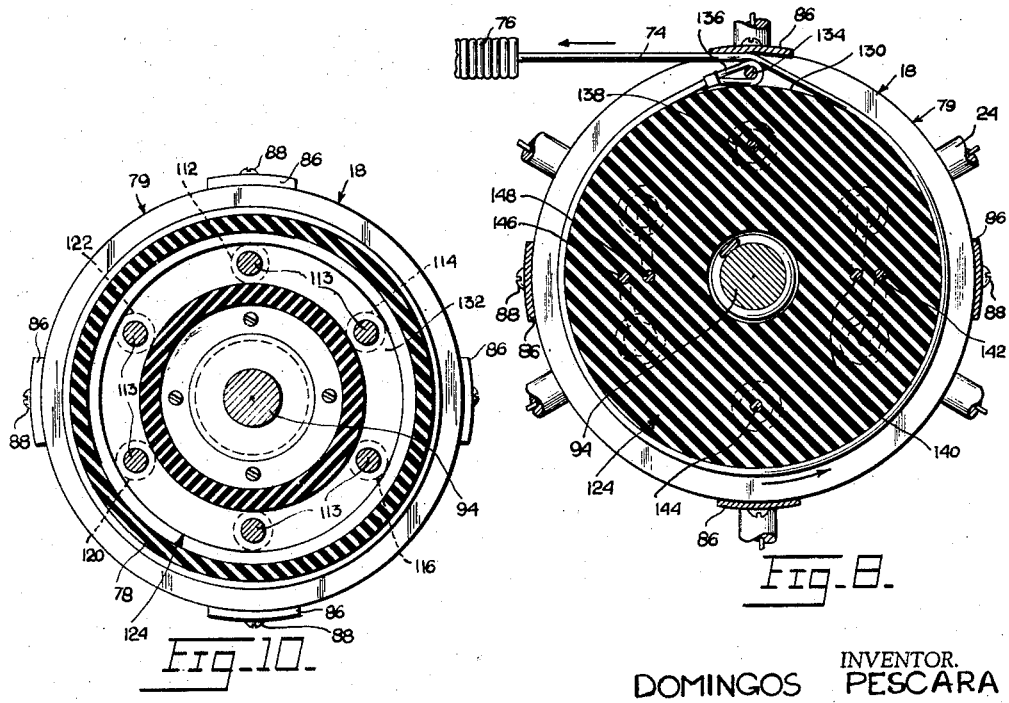
INVENTOR.
DOMINGOS PESCARA
BY
ATTORNEY United States Patent Office 2,887,463
Patented May 19, 1959

2,887,463

ANTI-THEFT DEVICE FOR MOTOR VEHICLES

Domingos Pescara, Marilia, Sao Paulo, Brazil

Application September 4, 1958, Serial No. 759,045

5 Claims. (Cl. 200—42)

This invention relates generally to anti-theft devices, and more particularly has reference to a device of this nature designed for use in an automotive vehicle, so as to prevent theft or unauthorized use of the vehicle in the absence of the owner.

One object of importance is to provide a device of the character stated which will be designed for mounting in an automobile with minimum modification and redesign of the vehicle. Thus, the device can be a separate attachment, that can be purchased after the vehicle has been placed in use, with said attachment being adapted for installation with a minimum of expense and difficulty.

Another object is to so design the device that anyone attempting to start the vehicle will be completely prevented from doing so.

Another object is to so form the device that it will resist attempts to circumvent the same, with this characteristic of the device being such that only by long, difficult labor and consequent loss of time can the device be placed out of operation. In this way, it is proposed to cause one who would otherwise attempt to steal or make unauthorized use of the vehicle to give up all thoughts in this direction, in view of the the obvious possibility that detection of the unauthorized act can occur during the time the device is being put out of operation by the unauthorized individual.

Another object is to provide a device of the character stated which will be comparatively inexpensive, so far as the cost of manufacture thereof is concerned.

Another object is to so form the device that whenever desired, it can be left inoperative, that is, one who is leaving his vehicle unattended only for a very short period of time need not place the device in operation unless he so desires.

Another object is to provide signal means associated with the device, which will immediately inform the vehicle operator whether or not the device is in operative position.

Still another object is to provide an anti-theft device of the character stated that will be particularly designed for use with a combination locking means, so that a very large number of different combinations can be provided, with a different combination for each vehicle owner.

Another object is to so form the device that it can be associated with vehicles of different makes and types. In accordance with the invention, it is necessary only that there be one form of the device for all four cylinder engines, another form for six cylinder engines, another form for eight cylinder engines, etc. In this way, the device need be made only in a very few basic forms, to be used with most vehicles of conventional design and make.

Another object is to provide a device for preventing theft or unauthorized use of the vehicle, which device will be disposed almost wholly within the engine department, that is, under the hood, the only portions of the device within the passenger department being a signal lamp, and a pair of operating knobs.

Another object is to provide a device as stated that will be designed to insure against accidental malfunctioning of the device, said device permitting normal operation of the vehicle at all times, when the device has been placed in inoperative condition, that is, a condition that will permit the engine to be started and continued in operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 6 is an enlarged longitudinal sectional view through the circuit breaking assembly of the device.

Fig. 7 is an end elevational view of the assembly shown in Fig. 6, on the same scale as Fig. 6, as seen from line 7—7 of Fig. 6.

Fig. 8 is a transverse sectional view on the same scale as Fig. 6, taken substantially on line 8—8 of Fig. 6.

Fig. 9 is a transverse section on the same scale as Fig. 6, taken substantially on line 9—9 of Fig. 6.

Fig. 10 is a transverse section on the same scale as Fig. 6, taken substantially on line 10—10 of Fig. 6.

Fig. 11 is a perspective view of a rotor embodied in the invention, on an enlarged scale, a pair of washers that are associated with the rotor being illustrated in exploded relation thereto.

Fig. 12 is a side elevational view, on the same scale as Fig. 6, of the circuit breaker assembly.

Figure 1:
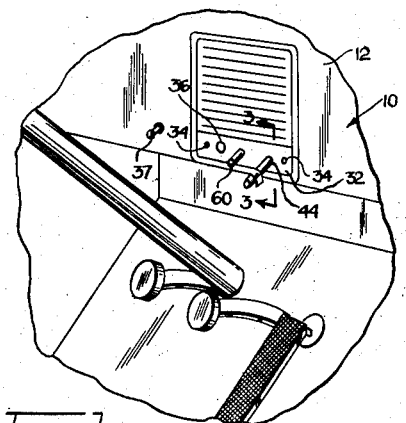
Fig. 1 is a fragmentary perspective view showing the interior of the passenger department of the vehicle, with the device being illustrated mounted upon the instrument panel.

Referring to the drawings in detail, designated generally at 10 is an automobile or other automotive vehicle, having in the passenger compartment the usual instrument panel 12. As is usual, the passenger compartment and the engine compartment are divided by a fire wall 14.

Mounted against the back surface of the instrument panel is the control assembly 16, so called by reason of the fact that it is the assembly that is under the control of the vehicle owner, for the purpose of placing the circuit breaker assembly 18 either in operative or inoperative condition.

The control assembly 16 includes an upwardly opening, rectangular, receptacle, the front wall of which is in face-to-face contact with the back surface of instrument panel 12. The receptacle, designated at 30, is engaged against the instrument panel 12 through the provision of a clamp plate 32, which can be chrome-finished or otherwise attractively surfaced due to the fact that it is visible within the passenger compartment (see Fig. 1).

Clamp plate 32 is apertured to receive screws 34, which extend through openings of the instrument panel and are threadedly engaged in openings of the front wall of the receptacle 30. In this way, the receptacle 30 and the clamp plate 32 are drawn tightly into engagement with the opposite faces of the instrument panel 12, by the fastener elements 34.

Mounted in the plate 32 is a pilot or signal lamp 36, clearly visible within the passenger compartment. At 37 (Fig. 1) there is shown the conventional ignition key, and there is a particular relationship between the ignition and the pilot lamp, which will be described in greater detail hereinafter.

About its upper edge, the receptacle 30 is formed with outwardly directed flanges 38, and peripherally contacting the flanges 38 is a flat, rectangular cover plate 40 secured to the flanges by spaced screws 42.

Projecting forwardly from the plate 32 is a rotatable and longitudinally shiftable operating rod 44, the forwardly projecting end of which has a knurled knob 46. Within the container 30, there is fixedly secured to the rod 44 a sleeve segment 48 having longitudinally spaced notches 50 in one longitudinal edge 51 thereof.

Extending in parallel, closely spaced relation to the operating rod 44 is a rotatable and longitudinally movable locking rod 52. The locking rod 52 is provided intermediate its ends with a sleeve 54 which is fixedly secured to the rod 52, and carried by the sleeve 54 are closely spaced discs 56, separated by screws 58 which can be located wherever desired upon the discs. The discs 56 have slots formed therein, into which slots the screws 58 extend.

A knob 60 is employed for rotating the locking rod 52, and a compression, coil spring 62 circumposed about the rod 52 exerts a continuous pressure against the discs 56, so that said discs are movable relative to one another in an axial direction, whenever a screw 58 of one disc is positioned in registration with a slot of a next adjacent disc.

This is achieved by rotation of the knob 60, that is, the knob 60 is first turned in one direction to rotate one disc 56 until its screw 58 moves into the slot of the disc in back of the same, responsive to expansion of the spring 62. Then the knob 60 is turned in an opposite direction, now rotating both of the discs, the slot and screw of which are interengaged. Rotation is now continued until the screw of the last or rearmost disc is registered with the slot of the intermediate disc 56, so that all the discs now rotate as one.

The several discs are peripherally notched, to receive a bar 64, having laterally projecting arms 66 movable into the notches 50. When all the discs 56 are rotatable conjointly, they have notches in registration to engage the bar 64 so as to shift the bar 64 laterally responsive to further rotation of the knobs 60, thus to disengage the arms 66 from the recesses 50. This permits axial movement of the operating rod 44.

Figure 5:
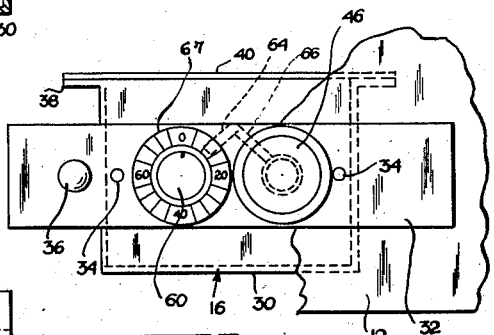
Fig. 5 is a view on the same scale as Figs. 3 and 4, showing the device as seen from the left of Fig. 3, a portion of the instrument panel being broken away.

The locking rod 52 has its rotation controlled by the user, through the provision of an annular series of numerical indicia 67 (Fig. 5) provided upon the clamp plate 32. These indicia permit the working of the combination by the authorized individual. Of course, the discs 56 are settable in any particular relationship desired, so that a very large number of different combinations can be provided.

At 68 there is shown a lateral extension on the inner end of the locking rod 52, adapted when in one position to move into engagement with a contact support plate 70 (see Fig. 3) carrying spaced contacts 72 bridged by the electrically conductive arm 68.

By reason of the arrangement illustrated, whenever the rod 52 moves to a position in which all the discs 56 are brought toward one another and are in an arrangement that will unlock the operating rod 44, the arm 68 is automatically disposed in bridging relation to the contacts 72. Contacts 72 are in series connection with the pilot lamp 36. Therefore, whenever locking rod 52 is moved axially to an unlocking position, the pilot lamp will be illuminated. Conversely, whenever the device is in locking position, the lamp is not energized.

The lamp is further related to the ignition of the vehicle, in that whenever the ignition key 37 is in "on" position, the lamp is deenergized, and conversely, when the key is turned to stop the motor and shut off the ignition, the lamp is permitted to be illuminated assuming that the locking device is in its operating or locking condition.

Figure 3:
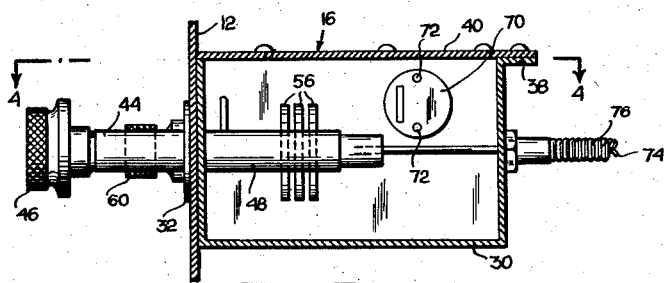
Fig. 3 is an enlarged sectional view through the control assembly of the device, substantially on line 3—3 of Fig. 1.
Figure 4:
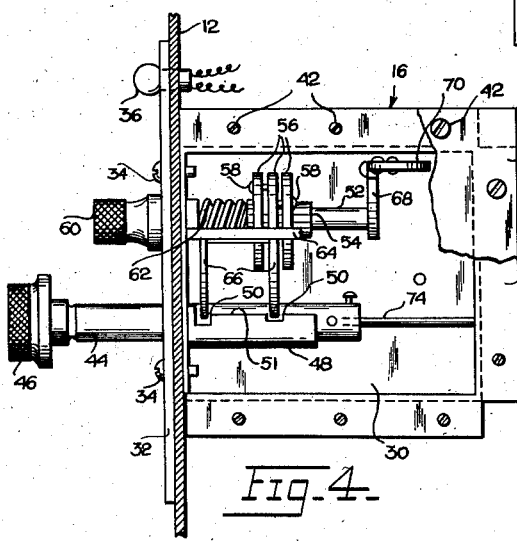
Fig. 4 is a horizontal sectional view on the same scale as Fig. 3, taken substantially on line 4—4 of Fig. 3.

By reason of the arrangement illustrated, whenever the rod 44 is pulled out, that is, shifted to the left in Figs. 3 and 4 to the position in which it is shown in these figures, the anti-theft device is in inoperative or circuit-closing position. When the rod 44 is moved to the right in Figs. 3 and 4, the device is in operative position, that is, the device is in vehicle-locking, circuit-opening position.

The circuit breaking assembly is operated by the push-pull action of the rod 44, through the medium of a Bowden cable 74 extending within a flexible housing 76 and connected to the rod 44 so as to be shifted longitudinally in opposite directions responsive to inward or outward movement of the rod 44.

The cable 74 extends to the circuit breaking assembly 18, which is mounted within the engine compartment (Fig. 2), being supported above the block in any suitable manner, as for example by a support strap of inverted U-shape designated at 75 and secured to any adjacent structural portion of the vehicle.

The circuit breaking assembly 18 includes a pair of oppositely but identically formed, cup-shaped sections 78 of a housing 79. The sections 78 are of insulation material, and in actuality, can comprise a pair of distributor caps, disposed in face-to-face or confronting relation. This, however, is not essential, and it is mainly important to note for the purposes of the present invention that the housing 79 is of generally cylindrical formation, having a large-diameter, central, cylindrically shaped cavity 82 (Fig. 6) defined by the confronting, communicating recesses 80 of the respective sections 78.

The inner faces of the sections are spaced apart to define a circumferential space 84 opening into the cavity 82 medially between the opposite ends of said cavity, said space 84 extending continuously through the entire circumference of the housing medially between the opposite ends thereof.

The sections 78 are connected in spaced relation by a plurality of connector plates 86, secured to the sections 78 by screws 88 (Fig. 12) and angularly spaced circumferentially of the housing in bridging relation to the space 84.

Figure 2:
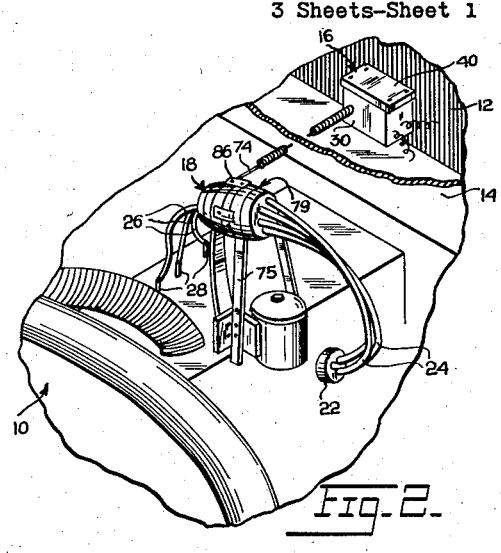
Fig. 2 is a fragmentary perspective view showing the engine compartment, and illustrating the portions of the device that are disposed in said compartment.

As will be noted from Fig. 2, the vehicle has the conventional distributor 22, from the cap of which extend leads 24. Leads 24 would ordinarily be connected directly to the spark plugs of the vehicle. However, in accordance with the present invention, they are engaged with the terminals of one section 78. Engaged with the terminals of the other section are leads 26 that extend to the spark plugs 28 of the vehicle. Only when all the terminals of the respective sections are electrically connected, in predetermined, paired relationship, will the vehicle be permitted to operate.

Centrally, axially extending within the respective sections 78 are axial bores 90 opening into the opposite ends of the chamber or cavity 82 so as to define an axial passage 92 within the housing 79. An elongated connector bar 94 extends through the passage 92, and has threaded ends projecting beyond the respective ends of the housing to receive nuts 96 bearing against outwardly projecting, tapered bosses 98 of the respective sections 78. In this way, the bar 94 is fixedly engaged within the housing in position extending axially of the cavity or chamber 82.

The terminals of the several leads 24 are cylindrically shaped, and are designated at 100, 102, 104, 106, 108, and 110 in Fig. 9. As will be noted, the section 78 has recesses receiving the terminals of the several leads 24. When the terminals are engaged in the recesses of the sections 78, they will engage corresponding contacts or terminals 111 of the section in which the terminals 100 are engaged. The several terminals 111 are spaced correspondingly to the terminals of the leads 24, as will be readily noted from Fig. 9. Therefore, an electrical connection is made between each lead 24 and a terminal 111 of the adjacent section 78.

In the illustrated example, the device is used in a six cylinder engine, but it will be understood that the number of terminals would be increased or decreased, according to the number of spark plugs or cylinders of the vehicle.

The other section 78, that is, the section 78 shown at the left in Fig. 6, has recesses receiving the terminals 112, 114, 116, 118, 120 and 122 of the leads 26 (see Fig. 10).

In the section 78 shown at the left in Fig. 6, there are terminals 113 spaced correspondingly to the several terminals 111, and adapted to be engaged by the terminals of the leads 26.

The several terminals or contacts 111, 113 project into the chamber 82 at the opposite ends of said chamber.

Generally designated at 124 is a rotor of electrically insulative material, including a cylindrical body 126 rotatably engaged in the chamber 82, said body being formed intermediate its ends with a circumferential rib 128 (see Fig. 11), said rib having a continuous circumferential groove 130.

Integrally formed on oposite ends of the body are reduced axial extensions 132, and one of these is recessed for a purpose to be made presently apparent hereinafter.

As will be noted from Figs. 6 and 8, extending across the groove 130 is a pin 134, about which extends a loop 136 on the inner end of the cable 74, said cable extending in a single coil or loop about the rotor within the groove 130. Therefore, when the rod 44 is shifted to the left to its Fig. 3 or Fig. 4 position, the cable 74 will be pulled in the direction shown by the arrows in Fig. 8, turning the rotor in a counterclockwise direction.

Embedded in the rotor and extending from end to end of the body thereof between the end recesses 132 of the body are electrically conductive connector rods 138, 140, 142, 144, 146, 148. As will be noted in Fig. 8, diametrically opposed rods 138, 144 extend in parallel relation to the axis of rotation of the rotor. Rods 140, 142, however, cross. Rods 146, 148 are similarly crossed. The rods 142, 146 may be longitudinally curved so as to be maintained out of electrical contact with the rods 140, 148, respectively.

Shaft or bar 94 has intermediate its ends an enlarged portion 150, snugly, rotatably fitting in one end of an axial bore 152 of the rotor. Portion 150 extends approximately half the length of the bore 152. For the other half of the length of said bore, shaft or bar 94 has a portion 154 the diameter of which is intermediate the diameters of the portion 150 and of the main length of the bar 94.

Coiled about the portion 154 is a torsion spring 156, one end of which is anchored in the shaft portion 150, and the other end of which is anchored in a disc or washer 158 of electrically, insulative material fixedly secured to the rotor body within end recess 159 of the rotor. A spacer washer 160 of electrically insulative material is interposed between the disc 158 and the adjacent end wall of the chamber 82.

Considering the operation of the circuit breaking assembly, it will be noted that when the rod 44 is pulled out, the rotor is turned against the restraint of the spring 156 to a position in which it provides an electrical connection between each terminal 111 and its associated terminal 113. In other words, the vehicle can be operated in these circumstances, and it will be understood that there is a prescribed relationship of the terminal of each lead 24, to the terminal of each lead 26. Thus, in the illustrated example terminal 100 is to be electrically connected to terminal 112 by the connector rod 138. Terminal 102 is to be electrically connected to terminal 116, by connector rod 140. Terminal 104 is connected to terminal 114 by rod 142. Terminal 106 is connected to terminal 118 by rod 144. Terminal 108 is connected to terminal 122 by rod 146. Terminal 110 is connected to terminal 120 by rod 148.

If the rotor is turned from the position wherein it provides an electrical connection between terminals, in a counterclockwise direction viewing the same as in Fig. 8, the connector rods will be moved laterally in respect to the terminals with which they engage at their opposite ends, thus breaking completely the electrical connection between the terminals of the leads 24 and the terminals of the leads 26. Turning of the rotor to break the circuit is effected by a pulling force on the cables 74, turning the rotor slightly against the restraint of the spring 156. When the rod 44 is pulled out, it is locked by the locking means in the manner shown in Fig. 4 and cannot be pushed back until the combination is worked.

It will be seen that in the event of an attempt to by-pass the apparatus, the thief would have to have a very good knowledge of motors of this type, and would have to be an experienced person with a good knowledge of the distribution, that is, the firing sequence, of the particular motors. He would also have to be equipped with special tools for the job, and in the majority of cases, would also be required to have available a so-called spark plug cable set. These are of different arrangements, for different makes of cars. In such instance one would have to cut the existing connections in the apparatus and then reconnect the wires, and this would be difficult. Further, should one attempt to cut the cable 74, this would be of no avail, because the spring would now be free to turn the rotor to a position in which the proper electrical connection between the terminals of cables 24, 26 still would not exist.

Attempts to tamper with the control assembly would also be difficult, due to its relatively inaccessible location.

It thus becomes clear that the device is so great a deterrent to theft of a vehicle that one observing that a vehicle is equipped with the device would not desire to invite detection by going through a laborious, time-consuming process of by-passing the apparatus to produce the necessary ignition in the vehicle engine.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An anti-theft device for vehicles comprising an axially shiftable operating rod, means for releasably locking said rod against operation by an unauthorized individual, a cable extending from said rod and shiftable longitudinally responsive to axial shifting of the rod, a housing including terminals at one end adapted for electrical connection to wires leading from a vehicle distributor, said housing including terminals at its other end paired with the several first-named terminals, the second-named terminals having electrical connections with wires extending to the vehicle spark plug, and a cylindrical rotor within the housing connected to the cable for rotation thereby, said rotor including a plurality of connector rods of electrically conductive material each of which provides an electrical connection between the terminals of a pair on turning of the rotor to one position, said cable being adapted to turn the rotor in one direction, the rotor being under spring bias tending to turn the same in an opposite direction, said cable being looped about the periphery of the rotor for turning the same responsive to longitudinal movement of the cable.

2. An anti-theft device for vehicles comprising an axially shiftable operating rod, means for releasably locking said rod against operation by an unauthorized individual, a cable extending from said rod and shiftable longitudinally responsive to axial shifting of the rod, a housing including terminals at one end adapted for electrical connection to wires leading from a vehicle distributor, said housing including terminals at its other end paired with the several first-named terminals, the second-named terminals having electrical connections with wires extending to the vehicle spark plugs, and a cylindrical rotor within the housing connected to the cable for rotation thereby, said rotor including a plurality of connector rods of electrically conductive material each of which provides an electrical connection between the terminals of a pair on turning of the rotor to one position, said cable being adapted to turn the rotor in one direction, the rotor being under spring bias tending to turn the same in an opposite direction, said cable being looped about the rotor for turning the same responsive to longitudinal movement of the cable, said rotor having a circumferential groove receiving the cable.

3. An anti-theft device for vehicles comprising an axially shiftable operating rod, means for releasably locking said rod against operation by an unauthorized individual, a cable extending from said rod and shiftable longitudinally responsive to axial shifting of the rod, a housing including terminals at one end adapted for electrical connection to wires leading from a vehicle distributor, said housing including terminals at its other end paired with the several first-named terminals, the second-named terminals having electrical connections with wires extending to the vehicle spark plug, and a rotor within the housing connected to the cable for rotation thereby, said rotor including a plurality of connector rods of electrically conductive material each of which provides an electrical connection between the terminals of a pair on turning of the rotor to one position, said cable being adapted to turn the rotor in one direction, the rotor being under spring bias tending to turn the same in an opposite direction, said cable being looped about the rotor for turning the same responsive to longitudinal movement of thet cable, said rotor having a circumferential groove receiving the cable, the housing having a circumferential opening registered with said groove for extension of the cable through the circumferential opening.

4. An anti-theft device for vehicles comprising an axially shiftable operating rod, means for releasably locking said rod against operation by an unauthorized individual, a cable extending from said rod and shiftable longitudinally responsive to axial shifting of the rod, a housing including terminals at one end adapted for electrical connection to wires leading from a vehicle distributor, said housing including terminals at its other end paired with the several first-named terminals, the second-named terminals having electrical connections with wires extending to the vehicle spark plug, and a rotor within the housing connected to the cable for rotation thereby, said rotor including a plurality of connector rods of electrically conductive material each of which provides an electrical connection between the terminals of a pair on turning of the rotor to one position, some of said electrically conductive rods extending parallel to the axis of rotation of the rotor, the remaining connecting rods extending obliquely to said axis, said other connector rods being arranged in pairs, the connector rods of each pair being crossed, the rotor having circumferential end recesses into which said terminals extend.

5. An anti-theft device for vehicles comprising an axially shiftable operating rod, means for releasably locking said rod against operation by an unauthorized individual, a cable extending from said rod and shiftable longitudinally responsive to axial shifting of the rod, a housing including terminals at one end adapted for electrical connection to wires leading from a vehicle distributor, said housing including terminals at its other end paired with the several first-named terminals, the second-named terminals having electrical connections with wires extending to the vehicle spark plug, and a rotor within the housing connected to the cable for rotation thereby, said rotor including a plurality of connector rods of electrically conductive material each of which provides an electrical connection between the terminals of a pair on turning of the rotor to one position, some of said electrically conductive rods extending parallel to the axis of rotation of the rotor, the remaining connecting rods extending obliquely to said axis, said other connector rods being arranged in pairs, the connector rods of each pair being crossed, the rotor having circumferential end recesses into which said terminals extend, the connector rods having their ends flush with one wall of said recesses.

References Cited in the file of this patent

UNITED STATES PATENTS

| | | |
|---|---|---|
| 1,410,443 | Anderton | Mar. 21, 1922 |
| 1,472,843 | Jackson et al. | Nov. 6, 1923 |
| 1,911,704 | Mayland et al. | May 30, 1933 |
| 2,136,673 | Carter | Nov. 15, 1938 |
| 2,750,459 | Hosea et al. | June 12, 1956 |